United States Patent [19]

Gaskill et al.

[11] Patent Number: 5,502,502

[45] Date of Patent: Mar. 26, 1996

[54] PLL-BASED METHOD AND APPARATUS FOR GENERATING VIDEO DRIVE SIGNALS FROM VARIOUS SYNC FORMATS

[75] Inventors: Gretchen T. Gaskill, Albuquerque, N.M.; Robert J. Vitello, Duluth, Ga.

[73] Assignee: Honeywell Inc., Minneapolis, Minn.

[21] Appl. No.: 398,708

[22] Filed: Mar. 6, 1995

[51] Int. Cl.$^6$ .................................................... H04N 5/12
[52] U.S. Cl. ........................... 348/546; 348/547; 348/536
[58] Field of Search .................................... 348/546, 540, 348/536, 531, 524, 521, 547, 548, 501; 358/150, 151; H04N 5/12, 5/06, 5/04, 5/05

[56] References Cited

U.S. PATENT DOCUMENTS

| | | | |
|---|---|---|---|
| 4,393,405 | 7/1983 | Ikeda | 348/536 |
| 4,639,780 | 1/1987 | Willis | 348/536 |
| 4,868,659 | 9/1989 | Modesitt | 348/548 |
| 5,153,725 | 10/1992 | Masaike | 348/536 |
| 5,281,926 | 1/1994 | Rabii | 348/536 |

FOREIGN PATENT DOCUMENTS 48306   6/1983   Japan .................................... 358/150

Primary Examiner—James J. Groody
Assistant Examiner—Chris Grant
Attorney, Agent, or Firm—Kenneth J. Johnson

[57] ABSTRACT

Various video signals provide horizontal sync pulses for generating a horizontal drive signal only during a horizontal sync portion and part of the vertical sync portion of a video signal. The invention generates a horizontal drive signal in the absence of horizontal sync pulses through the use of a phase locked loop (PLL) connected in feedback to horizontal counter logic. The counter logic receives pulses from the phase locked loop and at a predetermined count generates a horizontal drive signal. During the horizontal sync portion of the video drive signal, the frequency of the phase locked loop is determined by a time difference between a second signal derived directly from a horizontal sync pulse and a first signal generated by a predetermined count. The horizontal drive signal is thus synchronized to the horizontal sync pulses. During the vertical sync portion of the video signal, when horizontal Sync pulses may be absent, a vertical counter logic generates a vertical gating pulse that selects between the horizontal sync pulse and a delayed version of the first signal as the second signal to the PLL. The time difference between the first and second signals is approximately the same during both the horizontal and vertical sync portions, thereby keeping the horizontal drive signal roughly synchronized until horizontal sync pulses are again present.

9 Claims, 4 Drawing Sheets

PLL-BASED METHOD AND APPARATUS FOR GENERATING VIDEO DRIVE SIGNALS FROM VARIOUS SYNC FORMATS

GOVERNMENT RIGHTS

The Government has rights in this invention pursuant to Contract No. N00019-87-C-0025, awarded by the Department of the Navy.

BACKGROUND OF THE INVENTION

This invention relates generally to video raster graphics systems and, more particularly, to raster graphics systems capable of handling video signals of various video sync formats.

Video signals for raster graphics systems such as televisions and computer displays come in various sync formats. A sync format typically includes signals for synchronizing the horizontal and vertical movement of the electron beam within a cathode ray tube (CRT) monitor. Common sync formats include military, industrial and broadcast formats, each differing in some respects. The military and industrial formats, for example, do not generate horizontal sync pulses during the entire vertical sync portion of the video signal. This lack of continuous horizontal sync pulses may result in a temporary loss of synchronization in low cost raster graphics systems. More expensive raster graphics systems capable of handling such a temporary loss are normally required.

One approach to this problem of a lack of continuous horizontal sync pulses is described in my co-pending patent application entitled "Method and Apparatus for Generating Video Drive Signals from Various Video Sync Formats," U.S. patent application Ser. No. 08/196,344, filed Feb.14, 1994, assigned to the same assignee and hereby incorporated by reference. The present invention is an alternative to that approach.

Therefore, an object of the invention is to provide a means for allowing low cost .raster graphics systems that require continuous horizontal sync pulses to remain synchronized with video signals lacking such sync pulses, such as video signals having military and industrial formats.

SUMMARY OF THE INVENTION

In accordance with the invention, apparatus is shown and described for generating video drive signals from various video signal formats that may lack horizontal sync pulses during the vertical sync portion of the video signal. In a preferred embodiment of the invention, the apparatus includes a detector for detecting a composite video drive signal and extracting therefrom horizontal sync pulses occurring during a horizontal sync portion of the signal and vertical sync pulses occurring during a vertical sync portion of the signal. A phase locked loop generates pulses at a frequency determined by the difference in time between first and second signals. Horizontal counter logic is coupled to the detector for receiving horizontal sync pulses. The logic is also coupled to the phase locked loop and counts its pulses, generating a horizontal drive signal at a predetermined count after reception of a sync pulse. The counter logic thus synchronizes the horizontal drive signal to the horizontal sync signal. The counter logic also generates the first and second signals that control the frequency of pulses from the phase locked loop. The first signal is generated at a predetermined count. The second signal is generated during the horizonal sync portion of the video signal by a horizontal sync pulse and generated by a delayed version of the first signal during the vertical sync portion of the video signal. By continuing to generate the second signal in the absence of a horizontal sync pulse, a rough synchronization is maintained until the horizontal sync pulses are again present.

Vertical counter logic responsive to vertical sync pulses is used for generating a vertical gating pulse during the vertical sync portion of the video signal. The vertical gating pulse is applied to the horizontal counter logic to select between the horizontal sync pulse and the delayed version of the first signal as the second signal to the phase locked loop during the vertical sync portion.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

Figure 1:
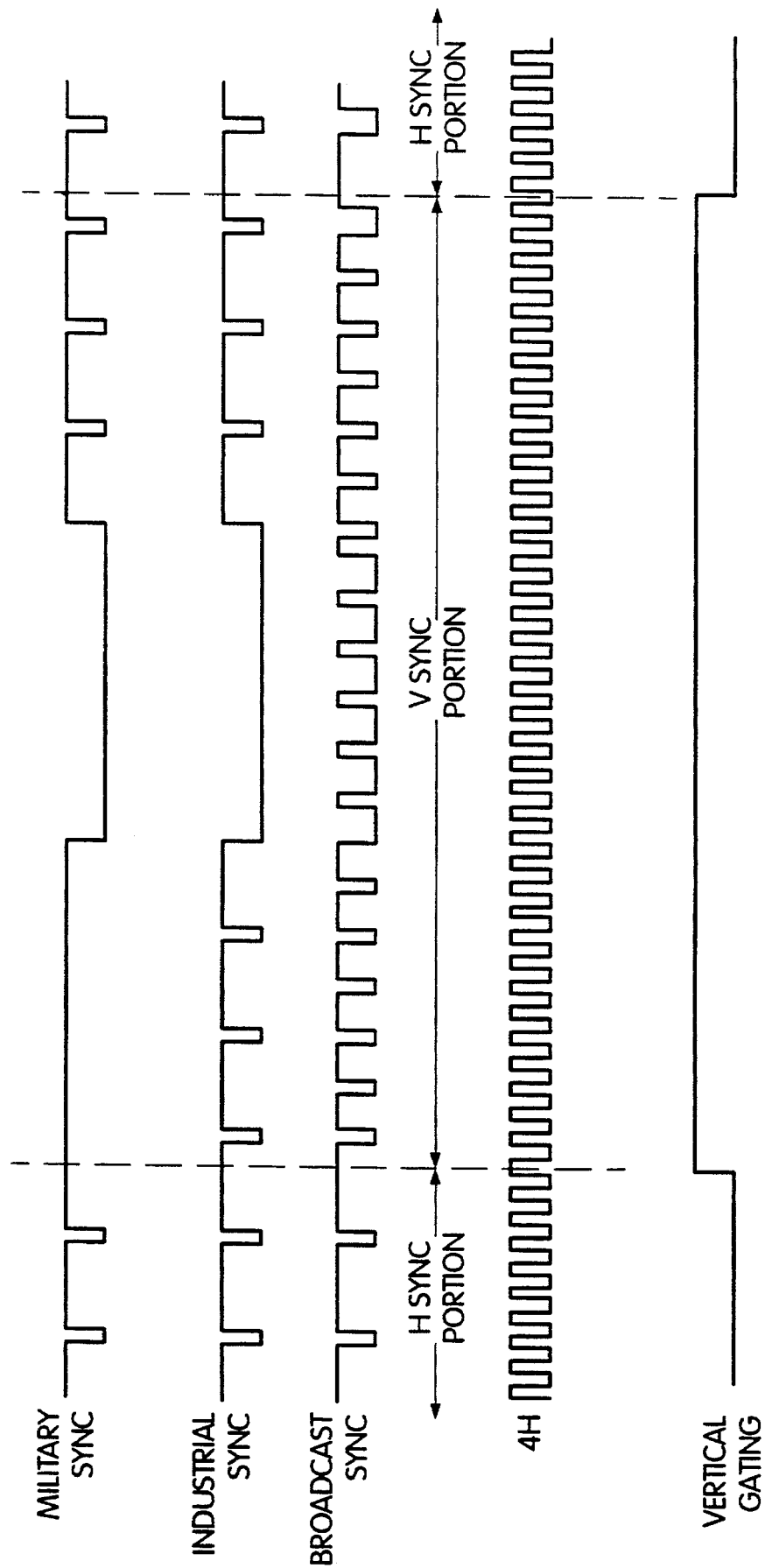
FIG. 1 is a timing diagram showing video sync signals for a number of video signal formats and showing a vertical gating pulse generated during the vertical sync portion of the video signals.

FIG. 1 shows three common types of video sync formats — military, industrial and broadcast. Each format has a horizontal sync portion followed by a vertical sync portion. However, only the broadcast sync format provides horizontal sync information (in the form of pulses) during the entire vertical sync portion. In the industrial and military sync formats, no horizontal sync information is provided during parts of the vertical sync portion of the video signal. If either the military or industrial formats is used with a conventional raster graphics system, this temporary lack of horizontal sync information can disrupt synchronization of the horizontal and vertical drive signals that drive a cathode ray tube (CRT) or equivalent device. FIG. 1 also shows a vertical gating signal, whose purpose will be described, which generates a gate pulse (active high) during the entire vertical sync portion of the video signal.

Figure 2:
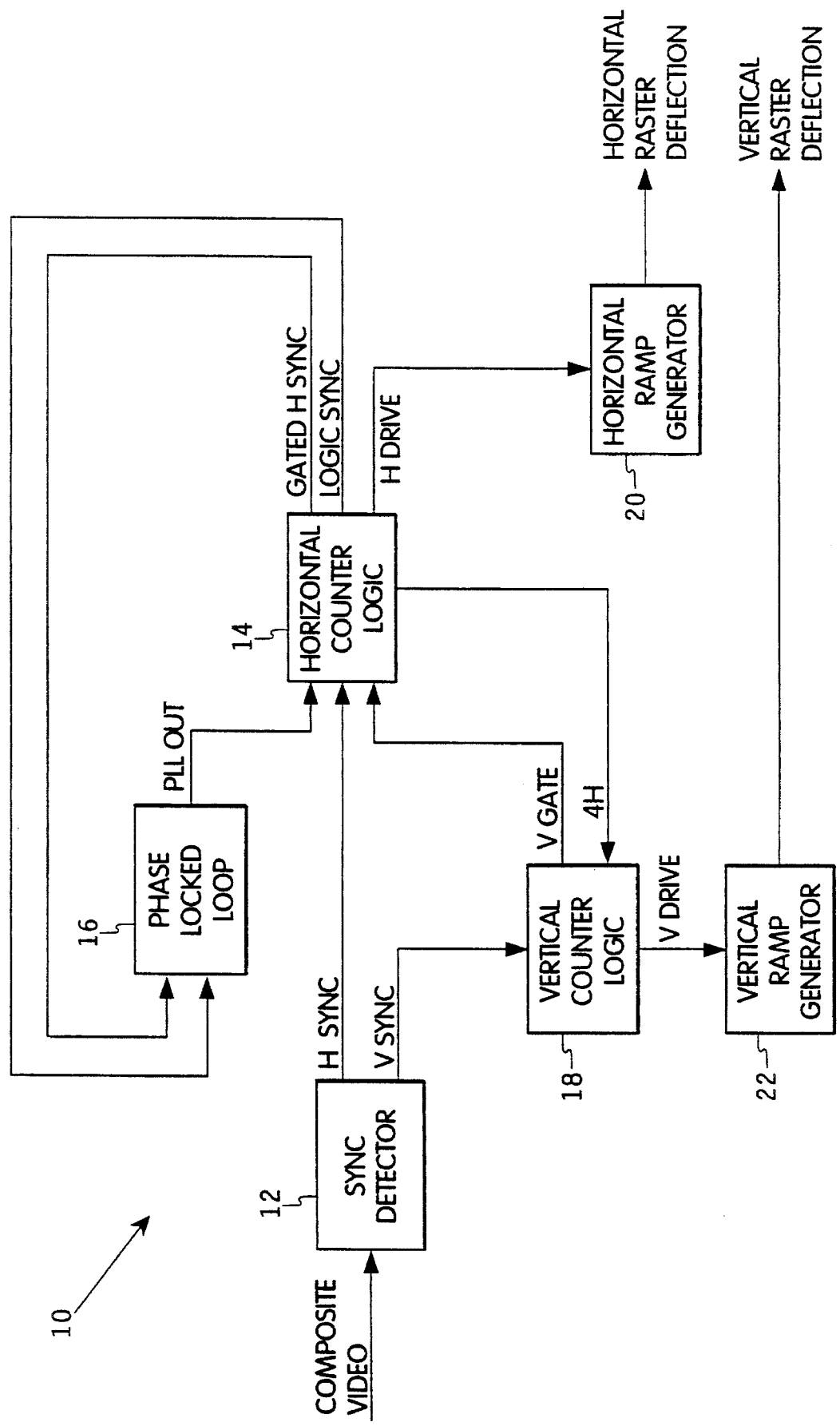
FIG. 2 is a block diagram of an apparatus according to the invention for generating synchronized horizonal drive pulses in the absence of horizontal sync pulses.

An apparatus 10 according to the invention is shown in FIG. 2. The apparatus includes a sync detector 12 for detecting a horizontal sync signal in the form of pulses (H Sync) and a vertical sync signal in the form of pulses (V Sync) within a composite video signal. Sync detector 12 is of conventional design and may include a level detector for detecting sync pulses (which have voltages below ground) and an integrator for distinguishing shorter horizontal sync pulses from longer vertical sync pulses. The sync detector 12 is preferably constructed to generate TTL level signals, although it may also generate signals of other levels.

From detector 12, H Sync is applied to a horizontal counter logic 14. Logic 14 in the preferred embodiment includes a counter within a programmable logic device (PLD). The counter within logic 14 counts continuously in response to periodic pulses (PLL OUT) received from a phase locked loop (PLL) 16. In addition to receiving H Sync and PLL OUT, logic 14 receives the vertical gating signal (V Gate) shown in FIG. 1 from a vertical counter logic 18. The output of logic 14 is four signals: a gated horizontal sync signal (Gated H Sync), a logic sync signal (Logic Sync), a horizontal video drive signal (H Drive) and a clock signal (4H). These signals are generally in the form of rectangular pulses although other forms are possible. Gated H Sync and Logic Sync form the inputs to PLL 16 to control the pulse frequency of its output signal, PLL OUT, as will be described. H Drive is applied to a horizontal ramp generator 20 for generating a horizontal deflection signal that controls the horizontal movement of the electron beam across the CRT screen. The signal 4H is a stream of pulses applied as a clock input to vertical counter logic 18.

The V Sync signal from sync detector 12 is applied to vertical counter logic 18 as a reset signal to reset a counter therein that counts pulses received from the 4H signal. When the counter within logic 18 reaches a higher predetermined count that corresponds to a time just before the arrival of the vertical sync portion of the video signal, the counter generates a V Gate pulse. The pulse is applied to counter logic 14 and persists until V Sync resets the counter and another, lower predetermined count is reached after reset. V Gate then disappears until the higher predetermined count is again reached. V Sync also passes through counter logic 18 to form a vertical drive signal (V Drive) which controls a vertical ramp generator 22. The vertical ramp generator generates a vertical deflection signal to move the electron beam vertically on the CRT.

Figure 3:
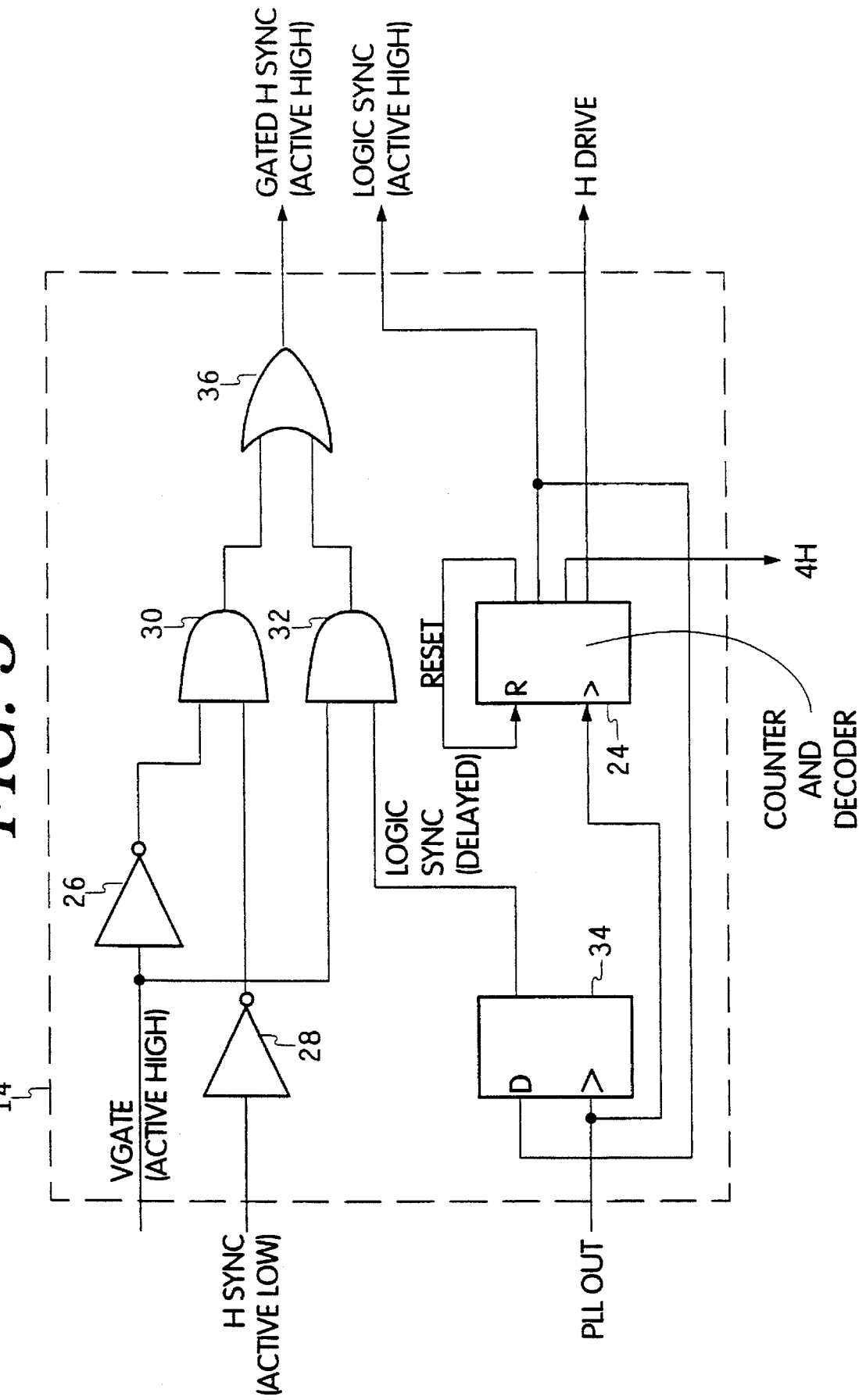
FIG. 3 is a schematic diagram of a horizontal counter logic portion of the apparatus of FIG. 2.

Referring now to FIG. 3, a preferred structure of logic 14 is shown. The logic includes a counter 24 that counts PLL OUT pulses. At a predetermined number of counts, counter 24 generates an H Drive signal. Counter 24 also generates a Logic Sync pulse, an internal Reset pulse and the pulses forming the 4H signal based on various predetermined counts. The 4H signal in the preferred embodiment has a frequency four times that of H Drive, although the frequency may be any multiple of H Drive greater than two. Also within logic 14 are inverters 26 and 28, AND gates 30 and 32, a D flip flop 34 and an OR gate 36. The V Gate pulse is applied to inverter 26 and AND gate 32. The H Sync signal is applied to inverter 28. PLL OUT is applied to the clock input of flip flop 34 and to counter 24. Logic Sync is applied to the D input of flip flop 34. And as previously noted, Gated H Sync and Logic Sync are applied as the inputs to PLL 16.

Figure 4A:
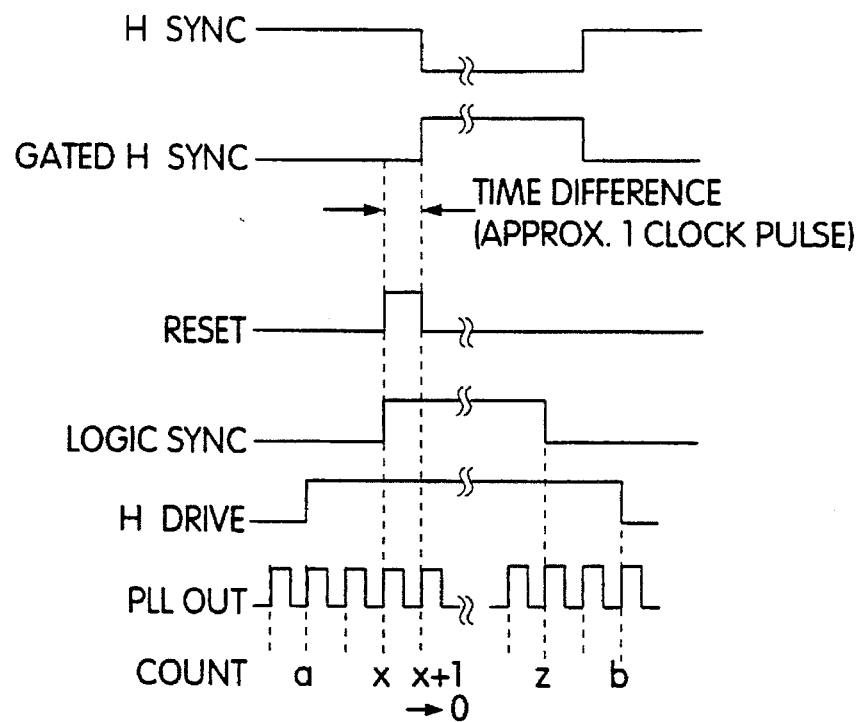
FIGS. 4A and 4B are timing diagrams of the various signals associated with the apparatus shown in FIG. 2.
Figure 4B:
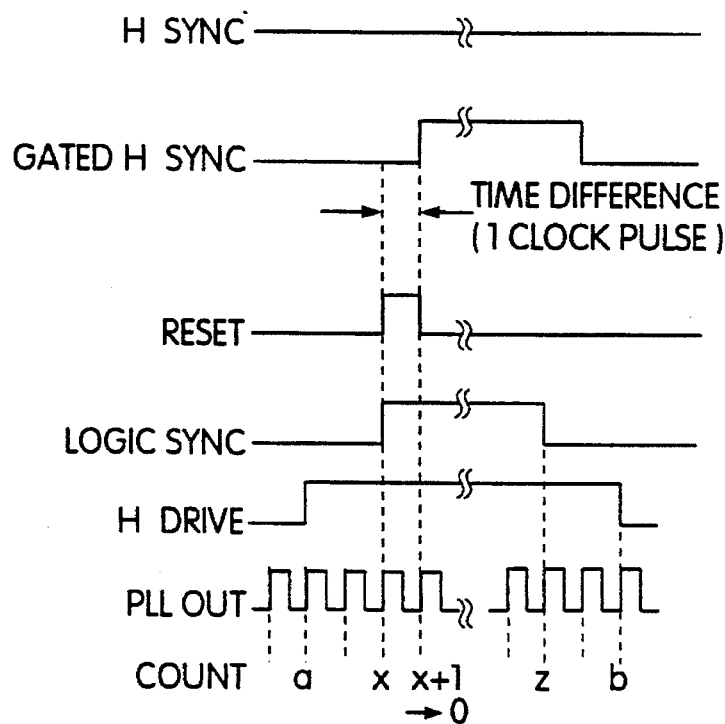

The operation of apparatus 10 may now be explained, with particular reference to FIGS. 4A through 4B. H Sync pulses are present in the video signal during the horizontal sync portion of the video signal, as shown in FIG. 4A. The V gate pulse is not present during the horizontal sync portion, as shown in FIG. 1. The H Sync pulses are inverted to produce Gated H Sync. The Logic Sync signal, a first signal, is generated on count x of counter 24. Logic Sync is applied with Gated H Sync, a second signal, to PLL 16 to control its frequency and hence the rate at which PLL OUT pulses are generated and counted by counter 24. The frequency of PLL varies inversely with the time that Logic Sync leads Gated H Sync. As the lead increases, the frequency of PLL 16 decreases, lowering the count and thus the lead time. As the time that Logic Sync leads decreases (even to the point of possibly lagging Gated H Sync), the frequency of PLL 16 increases, increasing the count and thus the lead time. The frequency of PLL 6 is thus "locked" to a predetermined frequency set by the count, corresponding to a time difference between the two signals of one clock pulse of PLL OUT. However, this time difference is a matter of design preference. PLLs available at the time of this invention could not lock well with zero phase shift between the first and second signals. A one clock pulse delay was simple to generate by using D flip-flop 34. The time difference may be any value that will work with the PLL of choice. For example, the time difference may be zero.

At the count of x, a Reset signal is also generated to reset the counter to 0 so that it begins counting toward predetermined counts. At a predetermined count z, the Logic Sync pulse disappears. Preferably, the Logic Sync pulse is the same length in time as Gated H Sync so that the PLL may effectively compare the signals. At a predetermined count b, the H Drive pulse disappears, having gone high at count a before counter reset. It should be understood that counts a and b can be any predetermined counts either before or after the counter resets to zero. What is important is that while H Sync is present, H Drive is generated by counts that are controlled by H Sync through Gated H Sync and PLL 16. In this manner, H Drive is synchronized to H Sync.

FIG. 4B shows the state of the various signals while a V Gate pulse is present. As noted above, the H Sync signal may disappear in certain video formats during the vertical sync portion of the video signal. The synchronization of H Drive to H Sync would thus be lost unless Gated H Sync is generated in some other manner while H Sync is possibly absent. In the present embodiment, Gated H Sync is provided during this time by the operation of the V Gate signal and logic 14. V Gate is generated by the counter of logic 18 to persist during a time that H Sync might be absent. The point in time at which V Gate may be generated is determined by choosing an appropriate predetermined count of 4H. With reference to FIG. 3, when V Gate goes high, it is applied to logic 14. V gate disables AND gate 30 (blocking transmission of H Sync during the vertical sync portion, whether H Sync is present or not) and enables AND gate 32 (substituting the output of flip flop 34 for H Sync as the source of Gated H Sync). The flip-flop output is designated as Logic Sync (delayed) in FIG. 3 because it is a delayed version of the Logic Sync signal delayed in this embodiment by a clock pulse of PLL OUT. Logic Sync thus leads Gated H Sync (which is Logic Sync (delayed)) by one clock pulse when the V Gate pulse is present. This is approximately the same lead time that exists between Gated H Sync and Logic Sync when H Sync is present. Consequently, PLL 16 continues to generate PLL OUT at substantially the same frequency as before. The other signals of interest including H Drive occur at approximately the same rate as when H Sync is present.

Frequency drift may occur during the vertical sync portion of the video signal, but not sufficiently to disrupt the operation of the apparatus. If the frequency of PLL 16 begins to increase, there is no corrective feedback because Gated H Sync and Logic Sync are the same signal differing only in phase and are locked together. However, any drift is minimal during the time a V Gate pulse is present. V Gate persists until another predetermined count is reached in counter logic 18, the count corresponding to just past the end of the vertical sync portion of the video signal. By that count, the horizontal sync portion and H Sync will have returned, and any drift in the PLL frequency is quickly corrected.

The horizontal counter logic 14 thus counts pulses from PLL 16 and generates a H Drive signal at a predetermined count. The counter logic also generates Logic Sync as a first signal and Gated H Sync as a second signal for controlling the pulse frequency of the PLL. Logic Sync is generated at a predetermined count of the counter logic 14. Gated H Sync is generated during the horizontal sync portion of the video signal by a H Sync Pulse. Gated H Sync is generated during the vertical sync portion of the video signal by a delayed version of Logic Sync. The V Gate signal is applied to horizontal counter logic 14 to select between the H Sync pulse and the delayed version of Logic Sync as Gated H Sync. During the horizontal sync portion of the video signal, V Gate selects H Sync. During the vertical sync portion, V Gate selects the delayed version of Logic Sync, when H Sync may be absent, thus persevering the synchronization of H Drive to H Sync (when H Sync returns).

Having illustrated and described the principles of the invention in a preferred embodiment, it should be apparent to those skilled in the art that the invention can be modified in arrangement and detail without departing from such principles. For example, features of the invention shown in hardware may also be implemented in software and vice versa.

Therefore, the illustrated embodiment should be considered only as a preferred example of the invention and not as a limitation on the scope of the claims. We therefore claim as our invention all modifications and equivalents to the illustrated embodiment coming within the scope and spirit of following claims.

The embodiments of the invention in which an exclusive property or right is claimed are defined as follows:

1. Apparatus for generating video drive signals from various video formats, comprising:

a detector for detecting a composite video drive signal and extracting therefrom horizontal sync pulses occurring during a horizontal sync portion of the video signal and vertical sync pulses occurring during a vertical sync portion of the video signal;

a phase locked loop for generating pulses at a frequency determined by a difference in time between first and second signals;

horizontal counter logic coupled to the detector and phase locked loop for counting pulses from the phase locked loop and generating a horizontal drive signal at a predetermined count and for generating the first and second signals to control the pulse frequency of the phase locked loop, the first signal generated at the predetermined count and the second signal generated during the horizonal sync portion of the video signal by a horizontal sync pulse and generated during the vertical sync portion of the video signal by a delayed version of the first signal; and vertical counter logic responsive to a signal from the horizontal counter logic for generating a vertical gating pulse during the vertical sync portion of the video signal, the vertical gating pulse applied to the horizontal counter logic to select between the horizontal sync pulse and the delayed version of the first signal as the second signal to the phase locked loop.

2. The apparatus of claim 1 wherein the signal from the horizontal counter logic to the vertical counter logic is a stream of pulses.

3. The apparatus of claim 1 wherein the vertical counter logic is coupled to the horizontal counter logic to count pulses of a clock pulse derived from the horizontal counter logic, the vertical counter logic generating the gating signal pulse at a predetermined count.

4. The apparatus of claim 1 wherein the time difference between the first and second signals during the vertical sync portion of the video signal is approximately equal to the time difference between the first and second signals during the horizontal sync portion.

5. The apparatus of claim 1 wherein the horizontal counter logic comprises a counter, a flip flop and a plurality of logic gates.

6. Apparatus for generating video drive signals from various video formats, comprising:

a detector for detecting a composite video drive signal and extracting therefrom horizontal sync pulses occurring during a horizontal sync portion of the signal and vertical sync pulses occurring during a vertical sync portion of the signal;

a phase locked loop for generating pulses at a frequency determined by the difference in time between first and second signals;

horizontal counter logic coupled to the detector and phase locked loop for counting pulses from the phase locked loop and generating a horizontal drive signal at a predetermined count and for generating the first and second signals to control the pulse frequency of the phase locked loop, the first signal generated at the predetermined count and the second signal generated during the horizonal sync portion of the video signal by a horizontal sync pulse and generated during the vertical sync portion of the video signal by a delayed version of the first signal; and vertical counter logic responsive to a stream of pulses from the horizontal counter logic for generating a vertical gating pulse during the vertical sync portion of the video signal, the vertical gating pulse applied to the horizontal counter logic to select between the horizontal sync pulse and the delayed version of the first signal as the second signal to the phase locked loop.

7. The apparatus of claim 6 wherein the time difference between the first and second signals during the vertical sync portion of the video signal is approximately equal to the time difference between the first and second signals during the horizontal sync portion.

8. A method for generating video drive signals from various video formats, comprising the following steps:

detecting a composite video drive signal and extracting therefrom horizontal sync pulses occurring during a horizontal sync portion of the signal and vertical sync pulses occurring during a vertical sync portion of the signal;

generating pulses at a frequency determined by the difference in time between first and second signals; and counting the pulses and generating a horizontal drive signal at a predetermined count and generating the first and second signals to control the frequency at which the pulses are generated, the first signal generated at a predetermined count and the second signal generated during the horizontal sync portion of the video signal by a horizontal sync pulse and generated during the vertical sync portion of the video signal by a delayed version of the first signal; and generating a vertical gating pulse during the vertical sync portion of the video signal in response to a signal from the counting step, the vertical gating pulse selecting between the horizontal sync pulse and the delayed version of the first signal as the second signal.

9. The method of claim 8 wherein the time difference between the first and second signals during the vertical sync portion of the video signal is approximately equal to the time difference between the first and second signals during the horizontal sync portion.

* * * * *